United States Patent [19]

Fish et al.

[11] Patent Number: 4,464,842
[45] Date of Patent: Aug. 14, 1984

[54] SUSPENSION SYSTEMS FOR FLUX GATE COMPASSES

[75] Inventors: Michael J. Fish, St. Martin D'Hers Grenoble, France; Michael J. Gill, Milford-On-Sea, England

[73] Assignee: Brookes & Gatehouse Limited, Lymington, England

[21] Appl. No.: 404,086

[22] Filed: Aug. 2, 1982

[30] Foreign Application Priority Data

Aug. 3, 1981 [GB] United Kingdom ................ 8123726

[51] Int. Cl.³ ............................................ G01C 17/28
[52] U.S. Cl. ........................................ 33/344; 33/361
[58] Field of Search ............. 33/344, 345, 361, 355 R; 248/636, 562, 581, 590, 607

[56] References Cited

U.S. PATENT DOCUMENTS 1,226,882 5/1917 Henderson ........................ 33/344 X
3,573,610 4/1971 Kesselring .............................. 33/361

FOREIGN PATENT DOCUMENTS 831637 1/1970 Canada .
182540 6/1922 United Kingdom ................. 33/344
506582 5/1939 United Kingdom .
800756 9/1958 United Kingdom .

Primary Examiner—William D. Martin, Jr.
Attorney, Agent, or Firm—Henry R. Lerner

[57] ABSTRACT

A suspension system suitable for a flux gate compass having compass windings (14) includes a ball joint (4,5,6) which permits both tilt and twist about a vertical axis, and a separate alignment element (16) for causing the windings to follow twisting motion of the fixed structure. The alignment element takes the form of a flexible printed circuit made into a double spiral form and carrying electrical conductors to provide the electrical connections to the windings. A zig-zag shape may be used instead of a spiral. The suspension does not suffer from the geometric imperfections of a Hooke's joint and avoids the need for separate flexible conductors which can interfere with the suspension operation and can break.

17 Claims, 6 Drawing Figures

SUSPENSION SYSTEMS FOR FLUX GATE COMPASSES

This invention relates to a suspension system for suspending a directionally indicative or sensitive device from a relatively fixed structure, which can be subjected to tilt about orthogonal horizontal axes and to twist about a vertical axis, and which transmits the twist to the device but not the tilt.

Such a suspension finds application for use with marine compasses for example, but could also be used with other devices such as direction finding aerials or optical surveying instruments.

HISTORY OF THE PRIOR ART

One well-known structure which can be used to provide such suspension is the Hooke's joint. However, the Hooke's joint is undesirable for two reasons. First, it is geometrically imperfect. If it is tilted in the quadrantal directions (relative to its principle axes), a degree of twist error is also introduced. This can be quite serious. For 30 degrees of tilt up to about 4 degrees of twist error can be introduced while for 45 degrees of tilt as much as 10 degrees of error can result. For accurate compass work this is clearly most undesirable.

A second disadvantage arises with the Hooke's joint if the device being suspended is an electrical device. In such a case, separate conductors are required to connect the device to the fixed mounting. Even if these are made very light indeed, they can still induce a degree of twist into the joint and cause the suspended device to be forced out of the true horizontal plane. Furthermore, when the wires are light, they are even more likely to break.

It is an object of the invention to provide a suspension system for suspending a directionally indicative or sensitive device so that the device remains horizontal when subjected to tilt about two orthogonal horizontal axes and so that twist about a vertical axis is transmitted to the device to keep it aligned with the mounting from which it is suspended.

It is a further object of the invention to provide such a suspension system wherein electrical conductors for connecting the device to external circuitry are integral with the means for keeping the device aligned with the mounting from which it is suspended when subjected to twist about a vertical axis.

BRIEF DESCRIPTION OF THE INVENTION

The invention comprises a suspension system for suspending a directionally indicative or sensitive device from a relatively fixed structure which can be subject to tilt about orthogonal horizontal axes and to twist about a vertical axis. The suspension system comprises a substantially spherically-symmetrical mechanical coupling, which permits relative tilt and twist, for supporting the device beneath the relatively fixed structure and alignment means having a spiral or zig-zag configuration. Opposite ends of the alignment means are coupled to the fixed structure and the device respectively, whereby the device is caused to follow twisting motion of the fixed structure.

Preferably, such a system comprises alignment means which is in the form of a strip and which provides electrically conductive paths thereon between the fixed structure and the device. Advantageously the alignment means is formed of a flexible printed circuit which is made from a planar shape and adopts a helical shape in use.

BRIEF DESCRIPTION OF THE DRAWINGS

The invention will now be described in more details by way of example with reference to the drawings, in which.

DETAILED DESCRIPTION

Figure 1:
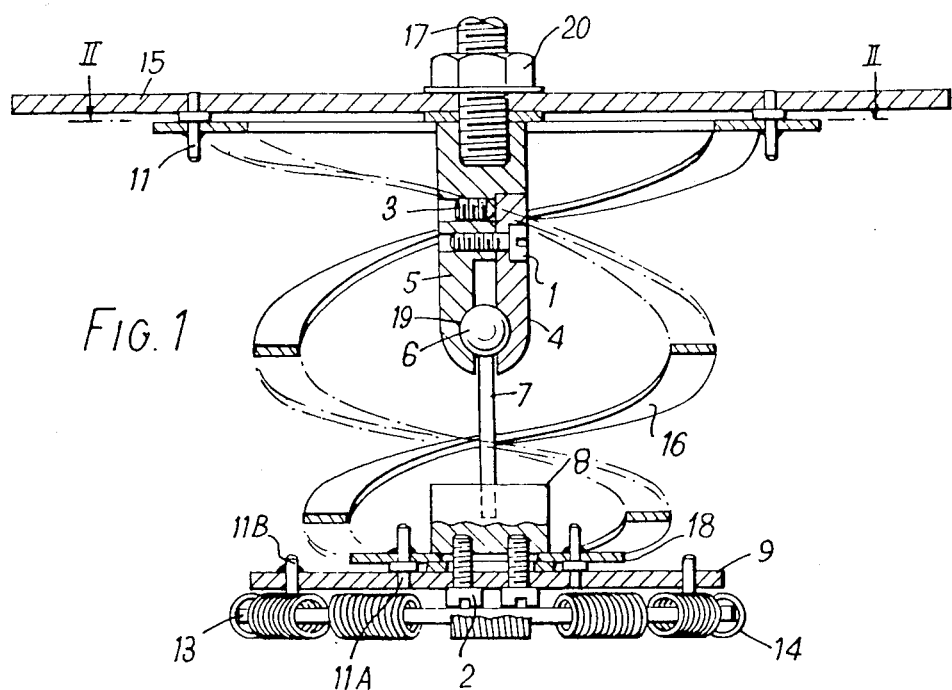
FIG. 1 is a sectional view through a first flux gate compass suspension system embodying the invention.

FIG. 1 of the drawings illustrates a suspension system which is used to suspend the windings 14 of a conventional flux gate compass from a fixed mounting, which in this case is represented by a shaft 17. The mounting may, for example, be fixed relative to a boat such that it is subjected to tilt (pitch and roll) about orthogonal horizontal axes, and also to twist about a vertical axis which, of course, represents a change in the direction of the boat.

The flux gate coil windings 14 are suspended by means of a ball 6 received in a bearing mounting which is formed of two opposed housing members 4 and 5 each having opposed part-spherical recesses 19 for receiving the ball. The ball 6 is a ruby ball having a hole drilled in it to receive a wire 7 on which the flux gate windings 14 are suspended. The member 5 is secured to the threaded lower end of the shaft 17 while the member 4 is held in place opposite member 5 by a screw 1 which clamps it to the member 5. The degree of tightness with which the ball 6 is held in the recesses 19 can be adjusted by means of a grub screw 3 which bears against the member 5 to cause the member 4 to pivot and grip the ball 6 more tightly. The ball joint thus formed allows the winding structure suspended on the wire 7 to tilt relative to the fixed shaft 17 in two orthogonal horizontal directions, and also to twist about the vertical direction.

With this arrangement, the coil windings 14 tend to remain in their original alignment when the boat changes direction due to the inertia of the windings 14, that is, the windings 14 twist relative to the shaft 17.

Figure 2:
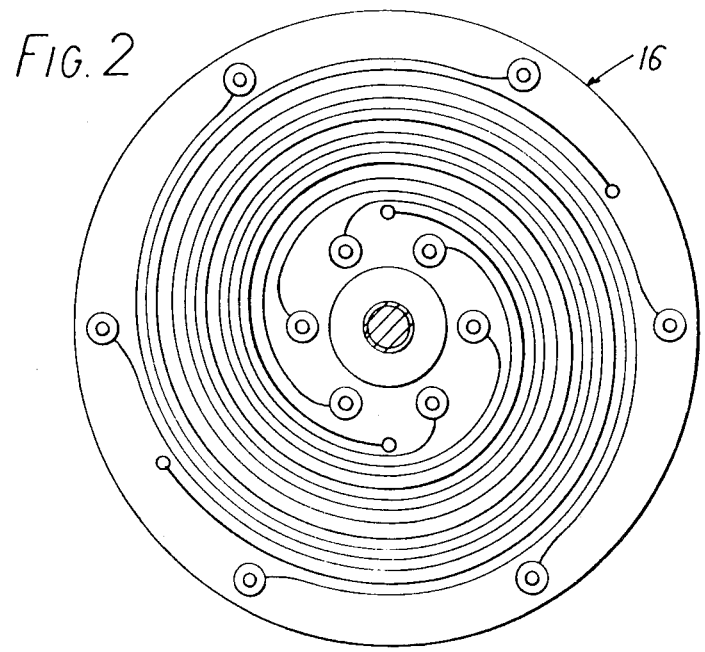
FIG. 2 is a plan view on the line II—II in FIG. 1 showing the flexible circuit providing alignment between the compass windings and the support.

In order that the coil windings 14 follow the twisting or azimuth movement of the fixed shaft 17, and hence of the boat, a separate twist communicating or alignment element is provided in the form of a flexible printed circuit 16. This is formed from a flat sheet of flexible material on which is printed a pattern of electrical conductors 38 such as to provide a plurality of conductor paths 21, in this case six, between the coil windings 14 and the fixed structure. The flexible circuit 16 is formed by cutting the planar sheet of material as shown in FIG. 2 along spiral cut lines 40 so as to form a double spiral, with each arm of the spiral executing approximately one and a half turns. The top end, as seen in FIG. 1, of the double spiral takes the form of a disc on which the conductors connect to terminal pins 11. The pins 11 are secured to a printed circuit board 15 which connects them to associated compass circuitry (not shown). The board 15 is securely mounted on the shaft 17 by means of a nut 20 which clamps the board 15 against the housing member 5.

The bottom end of the flexible circuit 16, which comprises the central disc-shaped portion 18 of the printed circuit, carries similar terminal pins 11A. These connect to a printed circuit board 9. The printed circuit board 9 has printed circuit conductors which connect each terminal pin 11A to a further terminal pin 11B on the board 9. A flux gate former element 13 is suspended from printed circuit board 9 by means of the terminal pins 11B. The flux gate former 13 is of annular shape and carries the twelve coil windings 14 which are electrically connected to the terminal pins 11B and, hence, to the circuit board 15 at the top end of the flexible circuit 16.

Immediately above the disc-shaped portion 18 of the flexible circuit 16 is a counterbalance weight 8. The counterbalance weight 8 is fixed to the circuit board 9 by means of screws 2 which pass through holes in the circuit board 9 and the disc portion 18 of the flexible circuit 16. From the top of the counterbalance weight 8 projects the wire 7 on which the winding structure 14 is suspended.

The ball joint formed by the ball 6 and housing members 4 and 5 permits both tilting and twisting movement of the suspended winding structure relatively to the fixed shaft 17. The twisting movement is, however, restrained by the flexible printed circuit 16, which adopts the configuration of a double spiral helix extending between the fixed shaft 17 and the flux gate winding support structure 13. Any relative twist which may develop between the suspended structure 13 and the fixed shaft 17 causes a 'winding up' or 'winding' of the spiral flexible circuit 16 which it immediately dissipates by twisting the suspended structure 13 back to its proper position relative to the fixed shaft 17 in which the flexible circuit 16 again occupies an unstressed configuration. As a result, the winding 14 return to their proper alignment with the fixed shaft 17 whenever the boat changes direction despite the inertia of the winding structure 13. Such a construction is found to provide remarkably consistent and accurate orientation of the suspended device relative to the fixed mounting 17.

A modified version of the suspension system shown in FIGS. 1 and 2 will now be described with reference to FIGS. 3 to 5.

In these Figures, the flux gate coil structure 70 is suspended by means of a ball joint formed by a ruby ball 62 and two opposed bearing members 55 supported by means of a suspension fork 56. The bearing members 55 are formed with conical bearing surfaces 57 which grip the ball 62 and the members 55 are slidable in the suspension fork 56 so that the tightness with which the ball 62 is gripped can be adjusted. The bearing members 55 are held in position by means of grub screws 59. A degree of damping of the movement of the suspended structure 70 is obtained by smearing the conical bearing surfaces 57 with heavy PTFE—loaded silicone oil.

The ball 62 is drilled on a diameter to form a hole which receives one arm of a generally trapezoidal wire frame 61 which carries the flux gate coil structure 70. As the frame 61 can pivot about the arm which passes through the ball 62 and the ball 62 can pivot about a horizontal axis perpendicular to the arm, the flux gate coil structure 70 hangs horizontally irrespective of any tilting of the fork 56 from which it is suspended. It is also possible for the ball 62 and suspended structure 70 to rotate relative to the fork 56 in so far as rotation is not prevented by the wire frame 61 contacting the fork 56.

Figure 3:
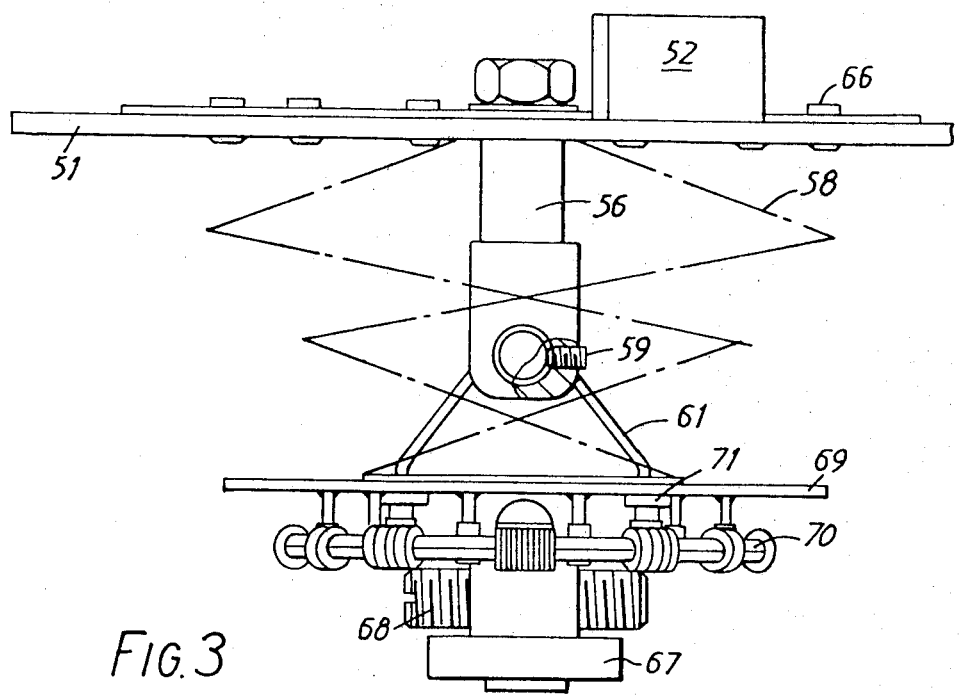
FIG. 3 is a side elevational view of a second flux gate compass suspension system embodying the invention.
Figure 4:
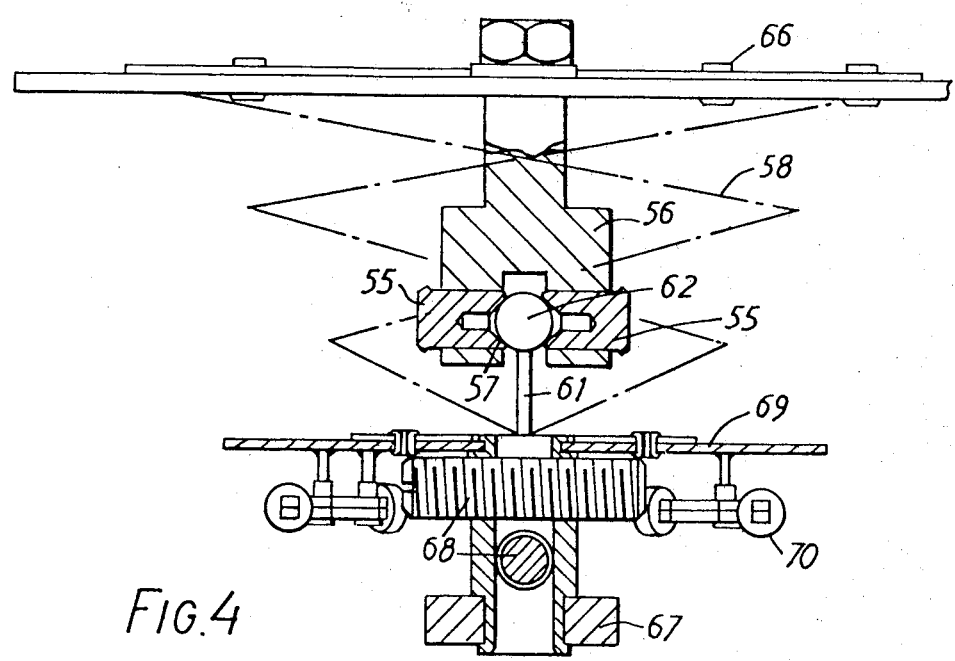
FIG. 4 is a side sectional view taken on the line IV—IV of FIG. 3.
Figure 5:
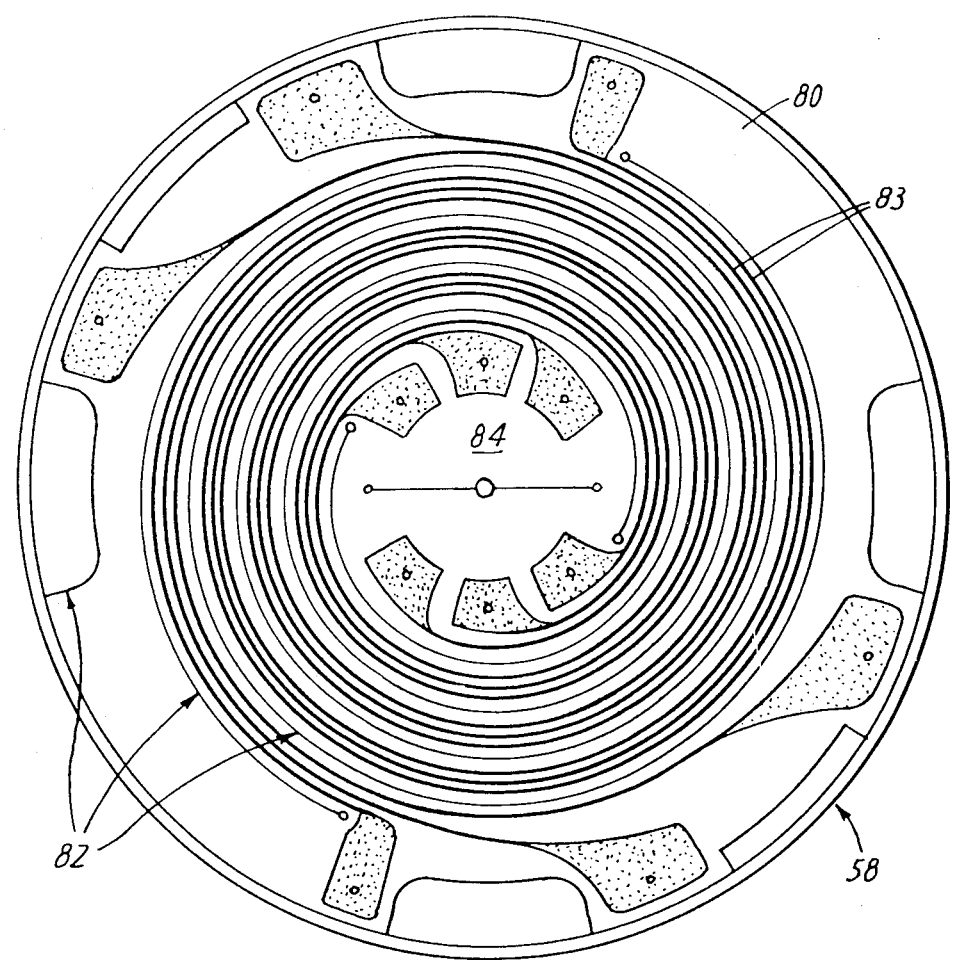
FIG. 5 is a plan view of the flexible printed circuit of the embodiment of FIG. 3.

In order that the coil windings of the flux gate assembly 70 follow accurately the azimuth movement of the fork 56 and, hence, of the supporting structure (in order to sense the heading of the vessel or vehicle), a separate alignment element is provided in the form of a flexible printed circuit 58, shown diagramatically in FIGS. 3 and 4. This is formed from a flat sheet of flexible printed circuit material 80 on which is formed a pattern of conductors 83 such as to provide the necessary electrical connections between the fixed mounting and the moving parts of the flux gate assembly. This flexible circuit 58 is formed by cutting the planar sheet 80 as shown in FIG. 5 along cut lines 82 so as to form a double spiral with each arm of the spiral executing approximately 1¾ turns.

The flexible circuit 58 may consist of a kapton base of thickness 50 μm with conductors of 35 μm soft-rolled copper and a 50 μm kapton coverlay. In order to make the finished circuit 58 as flat as possible, the base and coverlay are bonded together so that their respective directions of curvature are perpendicular to one another.

The central area 84 of the circuit 59 is attached to the suspended moving part of the system and the periphery to the fixed structure at the top. The top end of the flexible circuit 58 is annular in shape and is secured to the top side of a circular rigid printed circuit board 51 by six eyelets 66. The eyelets 66 also provide electrical connections from the flexible conductors 83 to tracks on the underside of the rigid board 51 and thence to external circuits by means of a connector block 52.

The two spiral arms of the flexible circuit 58 pass down through two cut-outs in the rigid board 51 in helical fashion until they join at the bottom end in the central disc shaped area 84. Here the same type of eyelet termination connects the flexible conductors 83 to tracking on the underside of a lower, smaller rigid printed circuit board 69.

The flux gate assembly 70 is secured underneath this board 69 by ten pins which are soldered into holes in the board. Connection is thus made via the track to the flexible conductors 83 to electrically connect the external circuits through the flexible conductors 83 to the flux gate assembly 70. To ensure that the moving assembly hangs accurately horizontally a balance washer 67 is mounted on the underside of the lower board 69 and the assembly also includes two screws 68 arranged at right angles for precise adjustment.

The 'legs' of the wire frame 61 are soldered into hollow terminals 71 fitted to the lower board 69. Thus the ball 62 support the moving assembly.

This arrangement will allow swinging of the suspended assembly 70 in two directions but only limited rotation about a vertical axis as described above. Such rotation is further restricted by the behaviour of the flexible circuit 58 which in this configuration has a pronounced resistance to coiling and uncoiling. It therefore serves to align the azimuth of the flux gate assembly 70 with that of the supporting structure (e.g. boat), even under conditions of pitch and roll, to a much greater precision than was formerly achievable with a Hooke's Joint type suspension. It is anticipated that an accuracy as good as one degree may be obtainable with an arrangement such as described.

Figure 6:
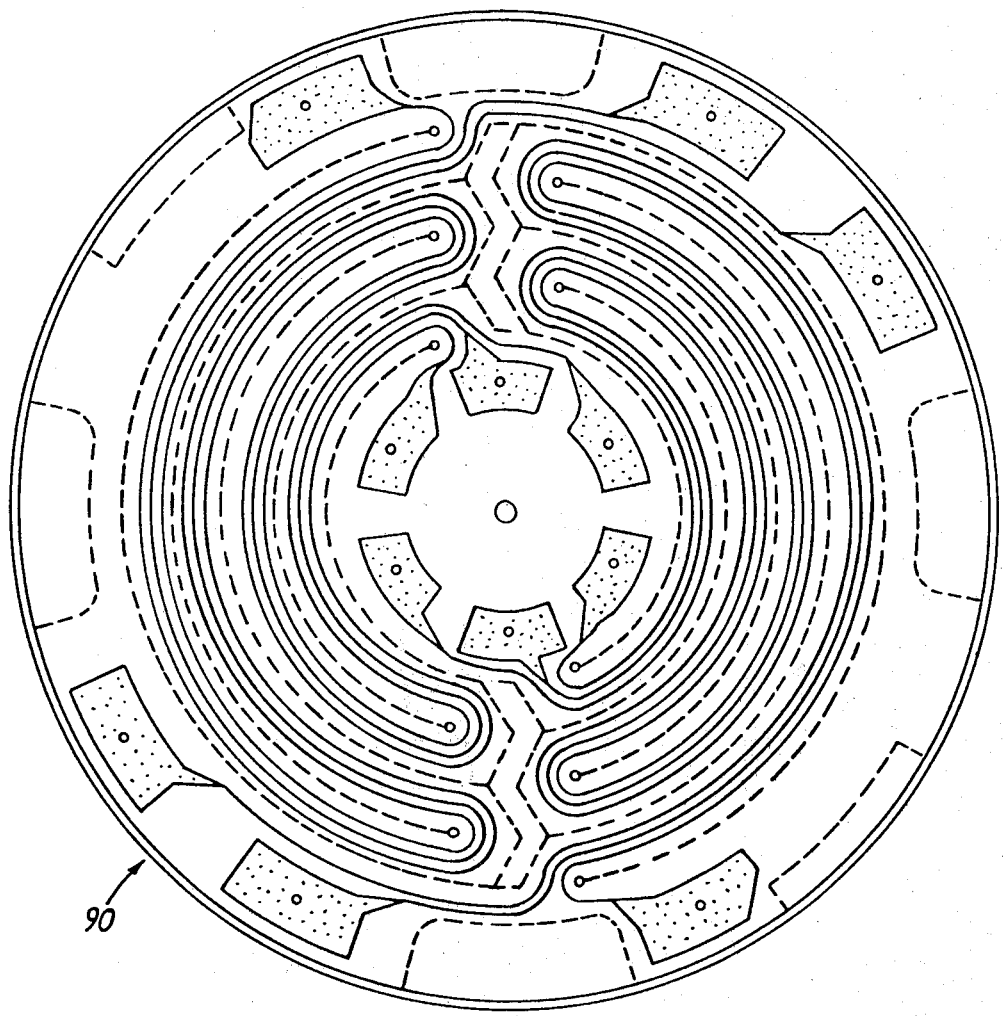
FIG. 6 is a plan view of a zig-zag flexible printed circuit in accordance with the invention.

While the examples illustrated use a double spiral helix in order to provide the required alignment function, an alternative arrangement would be to use a single spiral. In appropriate circumstances, the spiral arrangement could be substituted by a zig-zag configuration using one or more zig-zag elements 90 as shown in FIG. 6.

The examples illustrated have been given in the context of a flux gate compass. It will be appreciated however, that the arrangement may be suitable for other purposes where a direction sensitive or direction indicative function is required, such as in different forms of compass, in direction finding systems, or in optical surveying instruments.

What we claim is:

1. A suspension system for suspending a directionally indicative or sensitive device from a relatively fixed structure which can be subject to tilt about orthogonal horizontal axes and to twist about a vertical axis; the suspension system comprising:

a substantially spherically-symmetrical mechanical coupling, which permits relative tilt and twist, interconnecting said relatively fixed structure with said device for supporting the device beneath the relatively fixed structure; and alignment means having a spiral or zig-zag configuration;

said alignment means having opposite ends, one of said ends being coupled to the fixed structure and the other of said ends being coupled to the device, whereby the device is caused by said alignment means to twist about the vertical axis so as to follow twisting motion of the fixed structure.

2. A system according to claim 1 wherein the alignment means is of double-spiral configuration.

3. A system according to claim 1 wherein the alignment means is formed from a flat sheet and adopts a helical shape in use.

4. A system according to claim 1 having electrically conductive paths between the device and the fixed structure; the electrically conductive paths being integral with the alignment means.

5. A system according to claim 4 wherein the alignment means comprises a flexible printed circuit with the electrically conductive paths printed thereon.

6. A system according to claim 1 wherein the mechanical coupling is a ball joint.

7. A suspension system for suspending a directionally indicative or sensitive device from a relatively fixed structure which can be subject to tilt about orthogonal horizontal axes and to twist about a vertical axis; the suspension system comprising:

a substantially spherically-symmetrical mechanical coupling, which permits relative tilt and twist, interconnecting said relatively fixed structure with said device, for supporting the device beneath the relatively fixed structure;

alignment means having a spiral configuration, said alignment means having opposite ends, one of said ends being coupled to the fixed structure and the other of said ends being coupled to the device; whereby the alignment means causes the device to twist about the vertical axis so as to follow twisting motion of the fixed structure; and electrically conductive paths between the device and the fixed structure; the electrically conductive paths being integral with the alignment means.

8. A system according to claim 7 wherein the alignment means is a flexible printed circuit having the electrically conductive paths printed thereon.

9. A system according to claim 7 wherein the alignment means is of double spiral configuration.

10. A system according to claim 7 wherein the alignment means is of zig-zag configuration.

11. A system according to claim 7 wherein the alignment means is formed from a flat sheet and adopts a helical shape in use.

12. A system according to claim 7 wherein the mechanical coupling is a ball joint.

13. A flux gate compass arrangement having flux gate compass windings supported by a suspension system from a relatively fixed structure which can be subject to tilt about orthogonal horizontal axes and to twist about a vertical axis, the suspension system comprising:

a substantially spherically-symmetrical mechanical coupling, which permits relative tilt and twist, interconnecting said relatively fixed structure with said device for supporting the compass windings beneath the relatively fixed structure;

alignment means having a spiral or zig-zag configuration with opposite ends thereof coupled to the fixed structure and the compass windings respectively; whereby the alignment means causes the compass windings to twist about the vertical axis so as to follow twisting motion of the relatively fixed structure; and electrically conductive paths between the compass windings and the fixed structure, the electrically conductive paths being integral with the alignment means.

14. A compass arrangement according to claim 13 wherein the alignment means is a flexible printed circuit having the electrically conductive paths printed thereon.

15. A compass arrangement according to claim 13 wherein the alignment means is of double spiral configuration.

16. A compass arrangement according to claim 13 wherein the alignment means is formed from a flat sheet and adopts a helical shape in use.

17. A compass arrangement according to claim 13 wherein the mechanical coupling is a ball joint.

* * * * *